Dec. 26, 1933. J. W. O'DONNELL 1,940,766

MEASURING MACHINE

Filed July 13, 1926

INVENTOR
John W. O'Donnell
By his Attorney,
Nelson W. Howard

Patented Dec. 26, 1933

1,940,766

UNITED STATES PATENT OFFICE 1,940,766

MEASURING MACHINE

John William O'Donnell, Salem, Mass., assignor to The Turner Tanning Machinery Company, Portland, Maine, a corporation of Maine Application July 13, 1926. Serial No. 122,256

14 Claims. (Cl. 33—147)

This invention relates to measuring machines and more particularly to machines for measuring thickness dimensions of pieces of work. It is to be understood, however, that the invention and various important features thereof may have other applications and uses.

Machines for measuring pieces of work such as hides, skins, and pieces of leather commonly comprise one or more work contacting measuring members operatively connected to means for indicating measurements (of pieces of work) initiated by said work contacting members. It is an object of this invention to provide, in measuring machines, improved means for transmitting movements of such work contacting member or members to an indicating means in such manner that the indicating means will register movements of the work contacting member or members exactly without loss or magnification. It is a further object of the invention to provide a simple, durable, and highly efficient construction for measuring characteristics of pieces of work.

To these ends and in accordance with an important feature of the invention, there is provided, in the illustrated embodiment of the invention, fluid-operated means between a work contacting member or members and measurement indicating means for transmitting movements of the work contacting member or members to the indicating means. Since pressure applied to a body of fluid filling a chamber is transmitted in all directions without loss or magnification to the walls of the chamber, the effect of movements of a member arranged to press upon and displace a portion of the fluid in the chamber is transmitted exactly to another member movably mounted in the wall of the chamber and in contact with said body of fluid. Hence, any number of work contacting members may have their movements properly totalized in a body of fluid in a chamber and have the effect of such movements transmitted exactly to a movable member projecting into said body of fluid and associated with an indicating means. In the illustrated construction, a plurality of pistons are arranged to project into a body of liquid in a chamber, one of the pistons being connected to operate suitable indicating means and each of the other pistons being connected to one of the work contacting members so that movement of each work contacting member is transmitted through the liquid in the chamber to the piston associated with the indicating means, whereby the latter is properly responsive to the movements of the work contacting members.

For simplification in the reading of the measurements in the illustrated embodiment of the invention, no attempt is made to measure in any of the well known measuring units. On the contrary, measurements are indicated upon the dial of an indicator according to an arbitrary scale secured as a result of tests upon many pieces of work in a given type or class of work. For this reason a dial is provided which may be shifted relatively to the pointer to adjust the scale accurately for any given class of work. Such an arrangement of dial and pointer is also advantageous in a construction wherein a body of liquid serves to transmit motion to the pointer since it is easier to adjust the dial to the pointer than to adjust the pointer with respect to the dial by adding or removing liquid from its containing chamber.

Other features of the invention and novel combinations of parts will be described in detail in the specification and pointed out in the appended claims.

Figure 2:
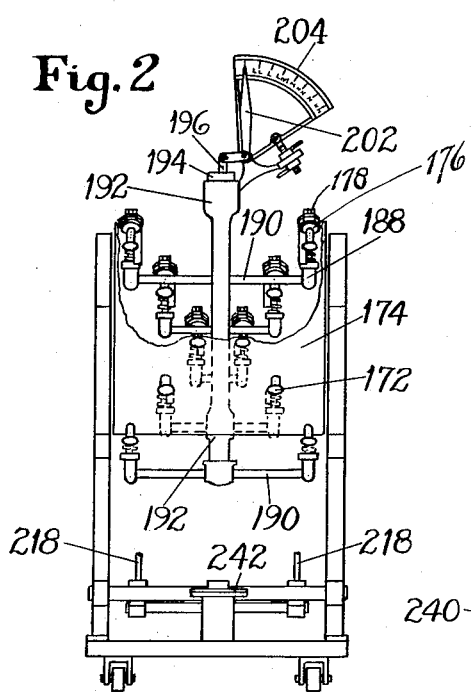
Fig. 2 is a front view of the machine of Fig. 1 taken along the line II—II and looking in the direction of the arrows.
Figure 1:
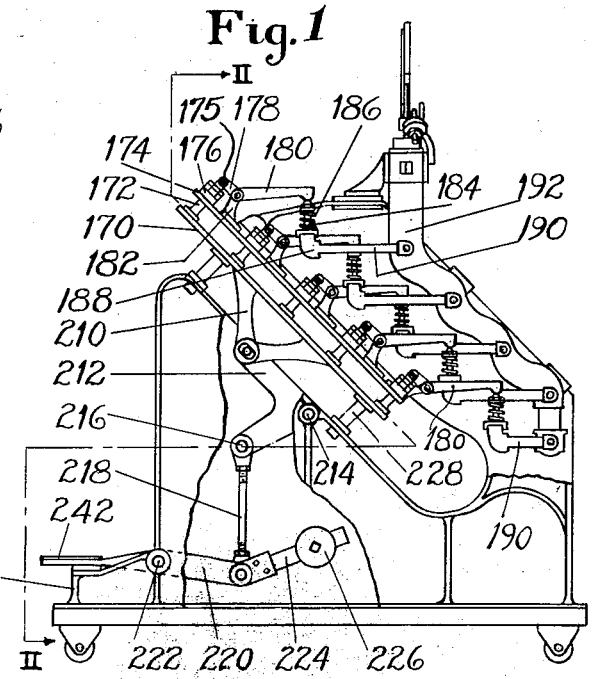
Fig. 1 is a view in side elevation of a machine illustrating one embodiment of the invention.

In the construction shown in Figs. 1 and 2 of the drawing which is specially designed for measuring the thickness dimensions of hides, skins, and other similar pieces of work, a slanting table 170 is provided for supporting the work and for pressing it against plungers or shafts 172, the plungers being arranged to serve as work-calipering members mounted within sockets in a plate 174 having on the upper surface of the plate 174 bosses 176 each having a portion of the containing socket for each shaft or plunger 172, the arrangement being such that each plunger 172, when in normal position, has an end portion projecting beyond the boss 174 to have pivoted thereto by a pin-and-slot connection 175 one end 178 of a bell crank lever 180, each lever being carried on a bracket 182 supported upon the upper face of the plate 174. At the other end of each lever 180 there is located a piston 184 held up by a spring 186 in contact with the adjacent end of the lever 180, the piston 184 being mounted in a chamber 188 at the end of a pipe 190 which communicates with the main pipe or reservoir 192, the arrangement being such that the main pipe 192 and all of its branch pipes 190 constitute one fluid-containing chamber. It is to be understood that each plunger or shaft 172 has connections similar to those just described for transmitting pressure to a fluid, such as water or oil, within the reservoir 192. Upon reference to Figs. 2 and 3 it will be observed that the upper end of the pipe or reservoir 192 has a straight vertical portion provided with an axially movable piston 194 arranged to be lifted by the column of fluid in said straight portion of the pipe, said piston carrying a post 196 to which is pivoted, by a pin-and-slot connection 197 one end of an arm 198 carried by pivot pin 200 which has fixed thereto a pointer 202 for movement over a dial 204. It will be obvious that upon upward movement of the table 170 the work is pressed against the shafts or plungers 172, which in turn operate the levers 180. Through operation of the levers 180, pistons 184 are operated to move through various distances in accordance with the thickness of the work under the plungers or shafts 172, thereby applying pressure to and causing movement of a fluid within the associated pipes 190. This pressure and movement is transmitted to the fluid in the main pipe or reservoir 192 and in this way the effect of all of the pressures and movements is totalized and is indicated visually upon the dial 204 through connections with the axially movable piston 194 as already described.

Since the table 170 (Fig. 1) is not movable in a vertical direction, but in a lateral direction to press the work against the plungers 172, it is desirable to use a special form of work support operating mechanism. It will be observed that the work support 170 carries a bracket 210 having a pin-and-slot connection with a bell crank lever 212 pivoted at 214 upon the frame of the machine. The other arm of the bell crank lever 212 is pivotally attached at 216 by means of a link 218 to a treadle 220 pivoted at 222 to the frame of the machine. As shown, the rear end of the treadle 220 carries an arm 224 with an adjustable weight 226 designed to offset the effect of spring pressed plungers 228 which yieldingly support the table 170, so that upon return of the table to initial work receiving position, there will be an absence of jar.

Figure 3:
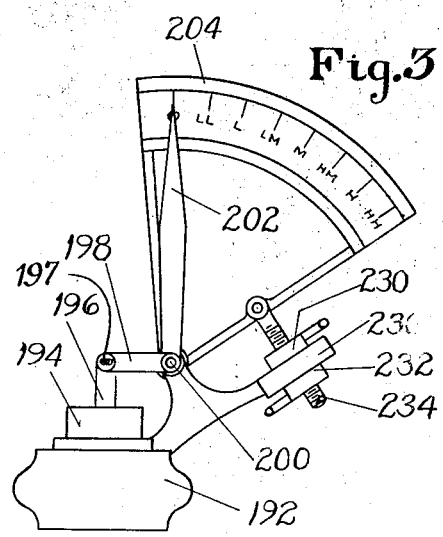
Fig. 3 is a detail view of the indicator mechanism employed with the machine shown in Fig. 1.

Fig. 3 of the drawing discloses a dial mechanism in which the dial 204 is movable relatively to the pointer 202 so that when the latter is in its initial position, or position of rest, the dial may be adjusted to relate the line of indicator characters properly with respect to the pointer upon a change in the class of work being measured by the machine. This adjustment of the dial 204 is accomplished through proper manipulation of the wing nuts 230 and 232 upon a screw threaded member 234 which passes loosely through a bracket 236 extending out from a stationary part of the machine frame.

The fact that the indicator mechanism employed with this measuring machine is operative to indicate the average thickness dimension of a skin undergoing measurement will be readily understood in view of the following considerations. In adjusting the indicator mechanism of Fig. 3, a skin of a known measurement having the usual variations in thickness dimensions throughout the area thereof is placed upon the work support for measurement, which takes place upon depressing the treadle to the proper extent. If this selected skin is of a grade which the manufacturer has decided to regard as his extra light thickness grade, the indicator mechanism may be made to register the measured skin on the work support as of this grade by adjusting the dial plate about its pivot until the line marked LL on the dial is made to coincide with the end of the pointer 202 which has moved from initial position to a position determined by the extent of movement of all the plungers 172. The dial when fixed in the position thus determined will be propely adjusted to register other grade thicknesses as light, light medium, medium, etc., in the same class of work, in accordance with the empirical spacings of the indicator scale on the dial. It will be understood that the dial will, in all probability, be changed and a new adjustment made of the substituted dial if sheep skins, for example, are to be measured as to weight in place of another grade of skins, such as calf skins, since the differences between different grades of calf skins will not be the same for the recognized grades of sheep or goat. Since all of the calipering members or plungers 172 contact with different parts of the skin being measured, and notwithstanding it is the sum of the movements of all of the plungers which is indicated on the dial, it is clear that each plunger affects the result in accordance with the thickness of the spot in the skin under each individual plunger. Hence, while no attempt is made to obtain an average of the various thickness dimensions of the skin in any of the well known units of measurement there is, in fact, an averaging of the result of the plunger movements since, as before stated, each plunger affects the total result and the latter is indicated through connections designed to produce, in the indicating pointer, movement the total range of which is limited in extent, representing a fraction only of the total distance moved by all of the plungers, and although the total distance moved is not divided by the number of plungers as in ordinary averaging operation. Movement of the pointer is over a relatively small arc of a circle divided into arbitrary divisions in accordance with numerous tests made upon suitably selected skins of known grade (i. e. of known measurement) indicated properly through proper adjustment of both the pointer and the dial about the pivot 200 in Fig. 3. An excellent reason for not indicating the thickness measurements in any of the units commonly employed for the purpose, i. e. in irons or in inches resides in the fact that by utilizing the empirical scale disclosed in the drawing the machine registers the measurements in terms which have been used for generations in the tanning industry and thus meets with no selling resistance on this point.

In the operation of the machine shown in the drawing the operator places a skin or other piece of leather over the table 170 while the table is in work receiving position in which it is so placed with respect to the plungers above that it is easy to introduce the work over the table by a single movement which draws the work in from the front or from one side of the table in a single sliding movement thereof. Upon stepping on the treadle the work support is moved toward the measuring plungers or calipering members 172, pressing the latter backwardly into their sockets until the treadle is brought to rest by a properly adjusted stop. (See stop 240 below tread 242 in Fig. 1). Obviously, each plunger or calipering member is moved along through its socket a distance which varies in amount from that of a neighboring plunger by reason of the difference in the thickness of the work at the spots where the plungers contact therewith. Since each calipering member or plunger is operatively connected to the indicator mechanism and particularly to the pointer which travels over the dial, it is clear that the result indicated on the dial partly through mechanical means and partly through hydraulic means as described, is an average of all of the thickness dimensions calipered by the plungers. Since the table is moved to cause measuring of the work during a single momentarily sustained depression of the operating treadle, a minimum of time is consumed in moving the work relatively to the calipering means. Further, since the table comes to rest at the end of its operative movement, the pointer also comes promptly to rest at the end of its movement to indicate the average thickness of the skin, and hence the reading may be observed by the operator without difficulty, there being practically no vibration of the pointer.

Having thus described my invention, what I claim as new and desire to secure by Letters Patent of the United States is:—

1. In a machine for measuring a piece of leather, a work support, means for yieldingly supporting the work support, a treadle for operating the work support comprising counter balancing means for returning the work support to work receiving position, a plurality of movably mounted plungers having their work contacting faces in a plane parallel to the surface of the work support, an indicating mechanism, and means for connecting the plungers with the indicating mechanism whereby movement of the plungers is registered for the inspection of the operator.

2. In a machine for measuring pieces of leather, a work support having a plane surface, a plurality of members having their work contacting faces arranged in a plane parallel with the plane surface of the work support, an indicating mechanism, and fluid-operated means between the members and the indicating mechanism for transmitting the movement of each individual member whereby the movement of all the members is averaged and registered.

3. In a machine for measuring pieces of leather, a work support having a plane surface, a plurality of plungers having their work contacting faces arranged in a plane parallel with the plane surface of the work support, means for causing relative movement of the work support and the plungers, an indicating mechanism, and fluid-operated means between the plungers and the indicating mechanism for transmitting the movement of each individual plunger whereby the movement of all of the plungers is averaged and registered during a single relative movement of the work support and the plungers.

4. In a measuring machine, a movable support for a piece of work, a movable work-calipering member for engaging the work on the support upon movement of the latter toward said member, a chamber containing a fluid, a piston arranged to project into the fluid in the chamber, means operated by the work-calipering member for moving the piston to cause the latter to displace fluid in the chamber, and means responsive to displacement of fluid for indicating the amount of fluid displaced, said means including a scale member and a pointer, the scale member being arranged for adjustment with respect to the pointer.

5. In a measuring machine, a support for a piece of work to be measured, a plurality of movable work-calipering members for contacting with the piece of work, a chamber containing a fluid, means responsive to the movement of the work-calipering members to displace fluid in the chamber in accordance with the movements of the associated calipering members, and means operated by the fluid for indicating the total displacement of the fluid in the chamber.

6. In a measuring machine, a support for a piece of work to be measured, a plurality of movable work-calipering members for contacting with the piece of work, a chamber containing a fluid, means connected to each calipering member and movable individually thereby to displace fluid in the chamber in accordance with the movements of its associated calipering member, and means responsive to displacement of fluid for visually indicating the total displacement of the fluid in the chamber.

7. In a measuring machine, a movable support for a piece of work to be measured, a plurality of movable work-calipering members for contacting with the piece of work, means for causing movement of predetermined uniform extent of the work support toward the calipering members, a chamber containing a fluid, means connected to each calipering member and movable individually thereby to displace fluid in the chamber in accordance with the movements of its associated calipering member, and means responsive to displacement of fluid for indicating visually the amount of displacement of the fluid in the chamber.

8. In a measuring machine, a support for a piece of work to be measured, a movable work-calipering member arranged for contact with the piece of work, a mounting for said calipering member, means for causing relative movement of predetermined uniform extent between the work support and the mounting for said member, a fluid containing chamber, a piston arranged to project into the fluid in the chamber for causing displacement of the fluid, connections between the calipering member and the fluid displacing piston, and means operated by the fluid for indicating the displacement of the fluid in the chamber, upon relative movement of the work support and member.

9. In a measuring machine, a support for a piece of work to be measured, a movable work-calipering member arranged to be moved upwardly by the piece of work in a measuring operation, a fluid containing chamber, a piston arranged to project into the fluid in the chamber and to move downwardly to displace fluid in the chamber, a bell-crank member movable by the upwardly movable calipering member for operating the downwardly movable piston in accordance with the amount of movement of the calipering member, and means operated by the fluid for indicating the amount of displacement of fluid by the piston.

10. In a measuring machine, a support for a piece of work to be measured, a plurality of movable work-calipering members for contact with the piece of work to be measured, a fluid containing chamber, a plurality of pistons each having a portion movable in said chamber and each movable by one of the calipering members to cause displacement of fluid in the chamber in proportion to the amount of movement of the calipering member, whereby the movements of the calipering members are totalized in the fluid, and means operated by the fluid for indicating the amount of said displacement of the fluid.

11. In a measuring machine, a work support for a piece of work to be measured, a plurality of movable work-calipering members for contact with the piece of work to be measured, a fluid containing chamber, a plurality of pistons each movable into the fluid in the chamber to displace fluid therein, a plurality of members each arranged to be moved by one of the calipering members and operatively connected to one of the pistons to control the movements of the latter directly in proportion to the amount of movement of the calipering member, whereby the movements of the calipering members are totalized in the fluid, and means operated by the fluid for indicating displacement of the fluid in the chamber.

12. In a machine for measuring hides, skins, leather and other similar pieces of work, a work support for a piece of work to be measured, a plurality of calipering members mounted for contact with a piece of work on the work support, a fluid containing chamber, a plurality of pistons movable in the chamber to displace the fluid therein, operative connections between each calipering member and one of the pistons, and means operated by the fluid for indicating the fluid displacement with respect to the chamber.

13. In a machine for measuring hides, skins, leather and other similar pieces of work, a work support for a piece of work to be measured, a plurality of calipering members mounted for contact with a piece of work on the work support, a fluid-containing chamber, a plurality of pistons movable in the chamber to displace the fluid therein, operative connections between each calipering member and one of the pistons, whereby each calipering member is caused to displace an amount of fluid proportionally to its own movement, an indicator comprising a dial, a pointer movable over the dial, and a piston movably mounted in the wall of the chamber and operable by the fluid displaced by the other pistons and connected to the pointer to operate the latter.

14. In a machine for measuring hides, skins, leather and other similar pieces of work, a work support for a piece of work to be measured, a plurality of work-calipering members mounted for contact with a piece of work on the work support, a fluid-containing chamber, a plurality of pistons movable in the chamber to displace the fluid therein, operative connections between each calipering member and one of the pistons, and means comprising a column of fluid communicating with the fluid in said chamber for indicating the fluid displacement with respect to the chamber.

JOHN WILLIAM O'DONNELL.